(12) United States Patent
Jolivet (10) Patent No.: US 7,466,467 B2
(45) Date of Patent: Dec. 16, 2008

(54) METHOD AND APPARATUS FOR GENERATING AN ANGULAR SWEEP OF A DIRECTED PROPAGATION OF ELECTROMAGNETIC RADIATION

(75) Inventor: Denis Jolivet, Toulouse (FR)

(73) Assignee: Intermac IP Corp., Everett, WA (US)

( * ) Notice: Subject to any disclaimer, the term of this patent is extended or adjusted under 35 U.S.C. 154(b) by 674 days.

(21) Appl. No.: 10/667,989

(22) Filed: Sep. 22, 2003

(65) Prior Publication Data

US 2005/0024703 A1   Feb. 3, 2005

Related U.S. Application Data

(63) Continuation-in-part of application No. 09/935,517, filed on Aug. 23, 2001, now Pat. No. 6,724,510.

(60) Provisional application No. 60/227,332, filed on Aug. 23, 2000.

(51) Int. Cl.
*G02B 26/08* (2006.01)

(52) U.S. Cl. .................. 359/214; 359/212; 359/213

(58) Field of Classification Search ......... 359/196–226, 359/730, 731, 857, 861, 862; 235/462.32, 235/462.33, 462.36
See application file for complete search history.

(56) References Cited

U.S. PATENT DOCUMENTS

| | | | | |
|---|---|---|---|---|
| 4,030,806 | A | * | 6/1977 | Goshima et al. ............. 359/201 |
| 4,953,961 | A | * | 9/1990 | Ubhayakar ................. 359/223 |
| 4,962,980 | A | | 10/1990 | Knowles |
| 5,021,641 | A | | 6/1991 | Swartz et al. |
| 5,136,415 | A | * | 8/1992 | Bean ........................... 359/213 |
| 5,484,995 | A | | 1/1996 | Scofield et al. |
| 5,751,465 | A | * | 5/1998 | Melville et al. ............. 359/213 |
| 5,914,480 | A | | 6/1999 | Swartz |
| 6,724,510 | B2 | * | 4/2004 | Jolivet ......................... 359/212 |

* cited by examiner

*Primary Examiner*—James Phan
(74) *Attorney, Agent, or Firm*—Seed IP Law Group PLLC (57) ABSTRACT

An angular sweep of a directed propagation of electromagnetic radiation is generated by a first oscillating or vibrating reflector that cooperates with at least one fixed reflector. Electromagnetic radiation, for example a laser beam, incident upon the first reflector is reflected to the fixed reflector with an angular sweep created by movement of the first reflector and in turn is reflected back to the first reflector at least once, each reflection back to the first reflector increasing again the angular sweep created by the previous reflection from the first reflector. Multiple reflections creating a wide angular sweep relative to the magnitude of the first reflector's movement.

21 Claims, 7 Drawing Sheets

METHOD AND APPARATUS FOR GENERATING AN ANGULAR SWEEP OF A DIRECTED PROPAGATION OF ELECTROMAGNETIC RADIATION

This application is a continuation-in-part of U.S. application Ser. No. 09/935,517 now U.S. Pat. No. 6,724,510 filed Aug. 23, 2001, which claimed the benefit of U.S. Provisional Application Ser. No. 60/227,332 filed Aug. 23, 2000.

BACKGROUND OF THE INVENTION

1. Field of the Invention

The present invention relates to creating a sweep of a directed propagation of electromagnetic radiation, for example, a beam of light, a laser or microwave energy. Specifically, the present invention relates to generating a sweep by amplifying the effect of a first movable reflector through repeated reflections back to the first reflector by a fixed reflector.

2. Description of Related Art

Beam sweeping is used, for example, in machine readable symbology scanning devices, for example bar code readers. A beam sweeping across a bar code is reflected back to the scanner where variations in the reflected light are detected, corresponding to the bar code. The sweep angle of the beam determines the range from and width of a code that may be scanned. The frequency of the sweep is a factor in determining the time necessary for a scan. The reading and the decoding of machine readable symbologies is commonly performed by two methods, discussed below. Available devices commonly function with a light or other electromagnetic radiation source and an electromagnetic radiation sensitive sensor, which is responsive to the source wavelength, allowing the detection of the variations in the reflection of the illuminated bar code.

The first method, for information, uses light concentrated in the zone of the code to be read, and a sensor CCD which converts the reflected light into electric information. Where the zone of the code is sequentially illuminated by a sweeping beam, the reflected beam may be detected and compared to the known location of the beam over a full sweep of the zone and a 2D image thereby captured for further decoding/processing.

The second method utilizes focused lighting, for example a laser beam—which oscillates left and right in a plane, and which collects the variations of light reflected on the bar codes with a photodiode. To obtain a focused laser beam which sweeps space according to an angle of approximately 20° to 40°, previous devices use either revolving mirrors to reflect a beam or a single oscillating reflector device with a large amplitude.

A revolving mirror device requires an electric motor, which consumes a large amount of energy, limiting battery life or requiring a fixed power connection. The energy is required to overcome the aerodynamic turbulence around the wheel with the mirror, which must spin at a very high velocity to achieve an acceptable sweeping frequency. The sweep angle generated by a rotating mirror is fixed by the number of mirror faces on the rotating assembly and is not modifiable after manufacture. One advantage of the revolving mirror is that the speed of the mirror may be adjustable, allowing the sweep frequency to be variable. However, revolving mirror scanners require a mechanical assembly which is bulky, in opposition to the trend of miniaturization with modern scanners. The rotating mirror type of mechanism also generates a noise, some vibration, and even a prejudicial gyroscopic effect noticeable by a user of the device.

Oscillating reflector devices with a large amplitude achieve the full sweep of the beam from the single oscillating reflector. By oscillating at a resonance frequency derived from the physical design characteristics of the reflector, this solution has the advantage of consuming little energy while at the resonance frequency. A useable sweep is generated by a plane mirror intercepting the laser beam-assembled on a system which is mechanically resonant and is maintained in resonance by electromagnetic energy. The amplitude of the vibration can be controlled, thereby adjusting the sweep angle but the sweep frequency is for practical purposes (energy consumption and MTBF) set by the resonance frequency resulting from the mechanical design.

The reading of bar codes with a sweeping laser beam requires a significant angular amplitude, the principle described hereafter makes it possible to reduce the amplitude of angular oscillation/vibration of the reflective moving element, without a corresponding reduction in final sweep angle.

It is an object of the present invention to provide a method and apparatus with low energy consumption, variable sweep angle and or sweep frequency without the problems and or limitations associated with the prior art. Further objects will be realized by one skilled in the art upon a review of the descriptions, figures and claims herein.

SUMMARY OF THE INVENTION

An angular sweep of a directed propagation of electromagnetic radiation is generated by a first oscillating or vibrating reflector that cooperates with at least one fixed reflector. Electromagnetic radiation incident upon the first reflector is reflected to the fixed reflector with a sweep created by movement of the first reflector and in turn is reflected back to the first reflector at least once, each reflection back to the first reflector approximately doubling again the angular sweep created by the previous reflection from the first reflector. Multiple reflections create a wide angular sweep relative to the magnitude of the first reflector's movement.

The small movement requirements of the first reflector enables the following benefits: compact design, low energy consumption, variable sweep frequency, no gyroscopic effect and a variable sweep angle.

BRIEF DESCRIPTION OF THE FIGURES

The present invention is described with the aid of the following figures.

DETAILED DESCRIPTION

The invention presented here allows, using low amplitude moving reflector(s), simple and passive optical or reflector components, to double, triple, or more compared to the amplitude of a single reflection upon the moving reflector, according to the configuration of the device, the amplitude of the angular sweep of a directed propagation of electromagnetic radiation. For example a collimated or focused laser spot, without affecting its luminous power, may be swept in a wide angle with only a small magnitude angle variable moving reflector in the form of a mirror. The invention also has application with any form of directed electromagnetic radiation, for example: microwave energy, visible and non-visible light, infra-red, radar and radio waves, where an angular sweep of the electromagnetic radiation is desired.

Figure 1:
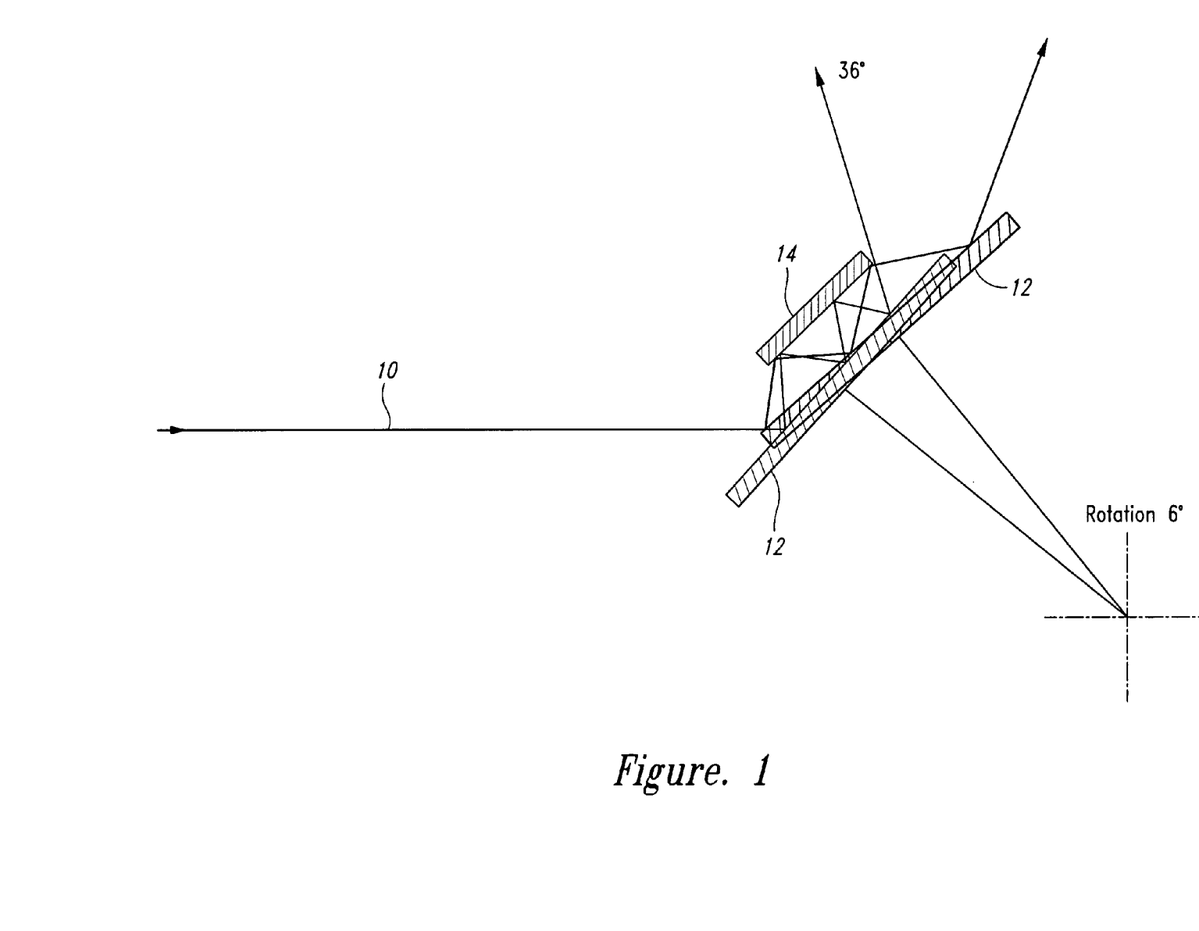
FIG. 1 is a diagram representing one embodiment of the invention.

According to FIG. 1, electromagnetic radiation 10 arrives from the left towards a movable (vibrating, oscillating) reflector 12 for example a mirror, having in this example, vibration in rotation of 6°. A fixed reflector 14, placed opposite the movable reflector 12, is located to intercept the electromagnetic radiation already angularly deviated by the movable reflector 12 and to return the electromagnetic radiation towards the movable reflector 12, thus at least doubling with each reference the angular deviation (sweep). Without the fixed reflector 14, the resulting sweep would be an angular deviation of 12° by simple reflection on the movable reflector 12. Here, the two passes between fixed reflector 14 and movable reflector 12 raise the angular deviation to 36° peak-peak of the electromagnetic radiation at output.

The relative alignment of the fixed and movable elements can be in any configuration that returns the electromagnetic radiation to the movable reflector. FIGS. 2 4-7 demonstrate alternative and non-exhaustive embodiments of the present invention that demonstrate the sweep range and level of compactness possible for a sweeping module constructed according to the present invention.

Figure 2:
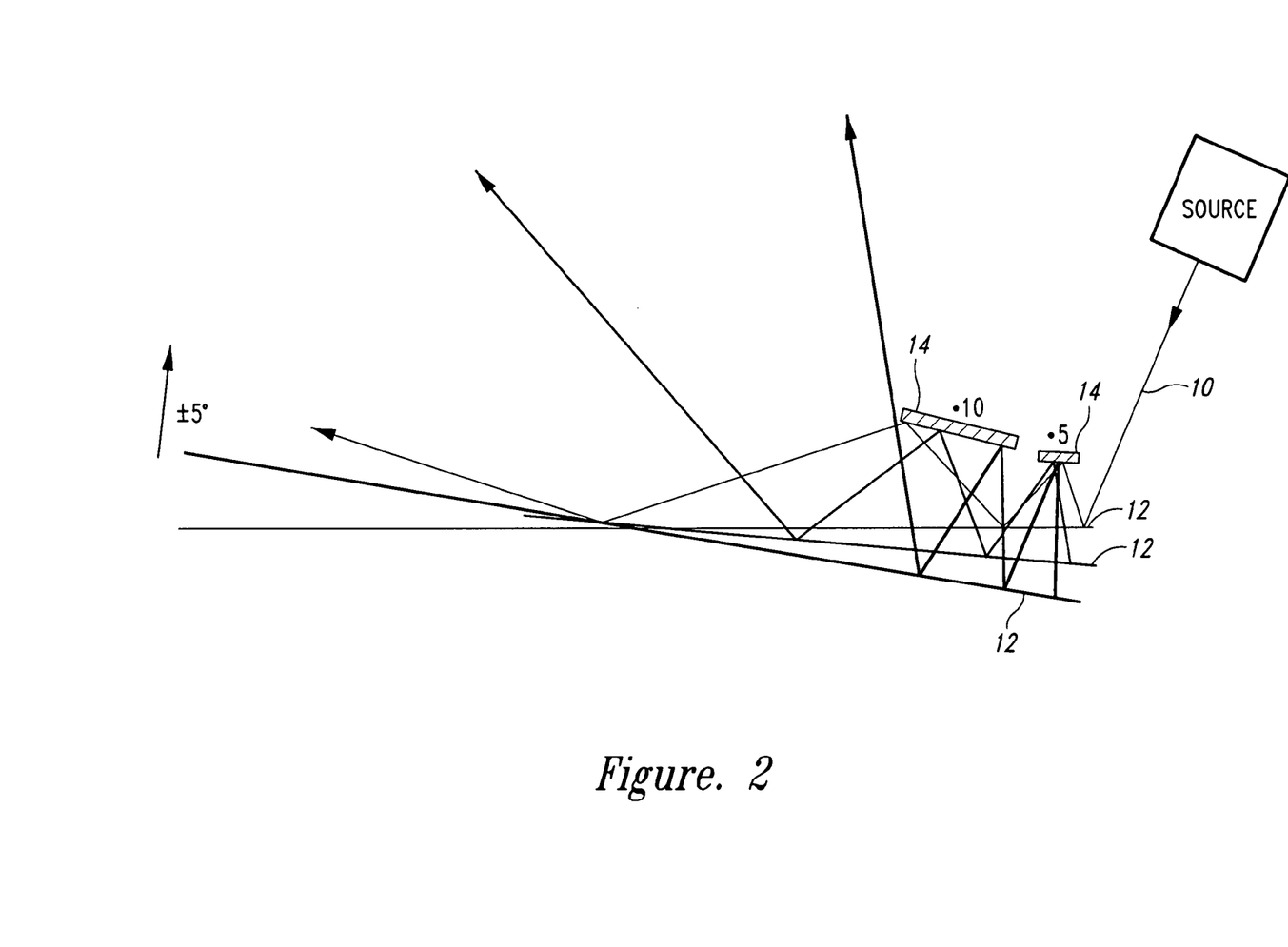
FIG. 2 is a diagram representing an embodiment of the invention using two fixed mirrors.
Figure 3:
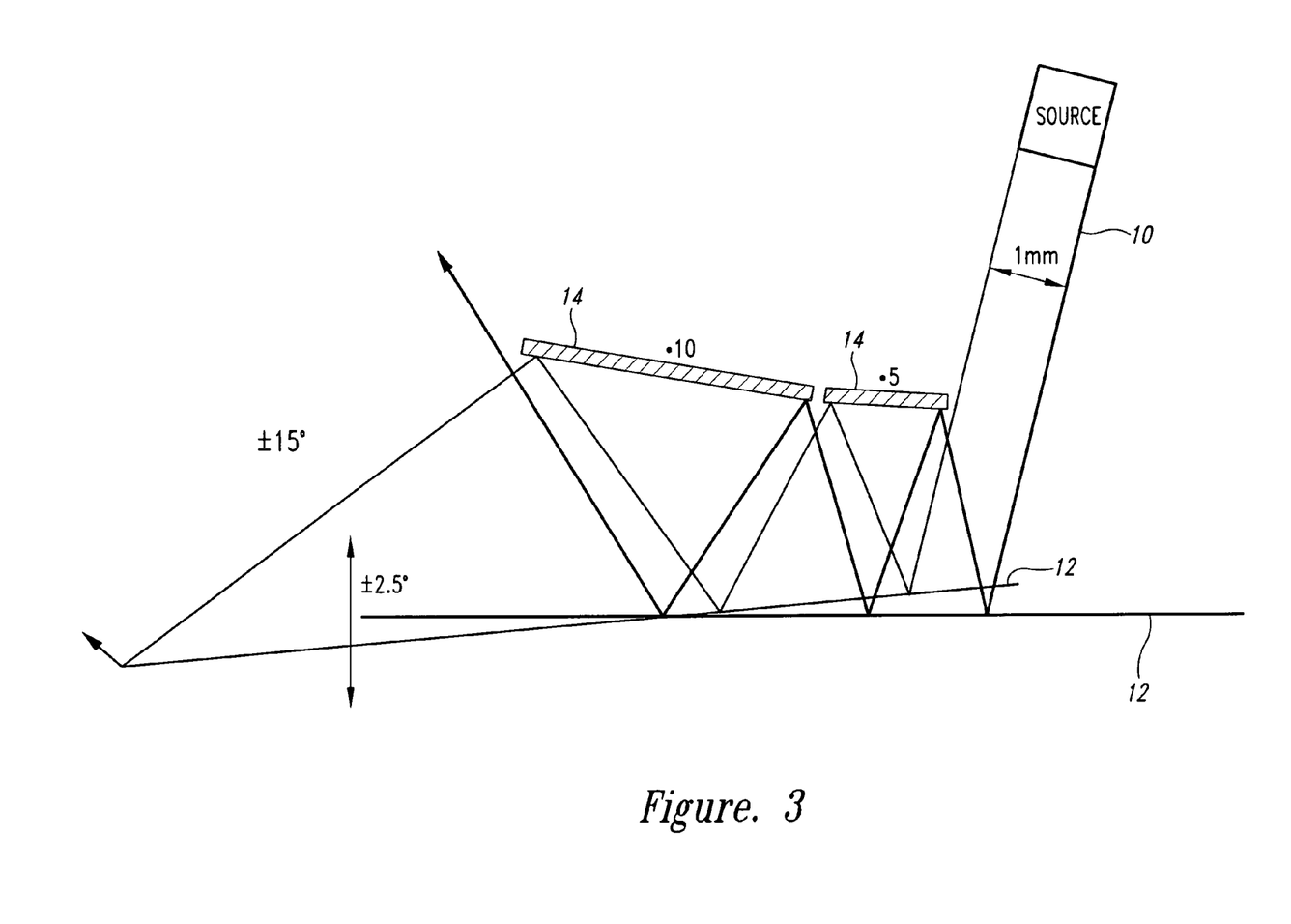
FIG. 3 is a diagram representing the embodiment of FIG. 2 where the directed propagation of electromagnetic radiation has a defined width, using rotational oscillation/vibration.

In FIG. 2, the vibration/oscillation of the movable reflector 12 of 10°, gives 60° at output. The use of two fixed mirrors 14 enables a reflection path optimized for a compact sweeping module. FIG. 3, shows a similar layout applying rotational movement, one half the amplitude, accounting for the requirements of the electromagnetic radiation having a practical diameter. Taking again the provision of FIG. 2, the physical width of the directed propagation of electromagnetic radiation, for example a laser spot (here of 1mm), compared to dimensions of the mirrors as drawn affects the amplitude of the resulting beam sweep.

Figure 4:
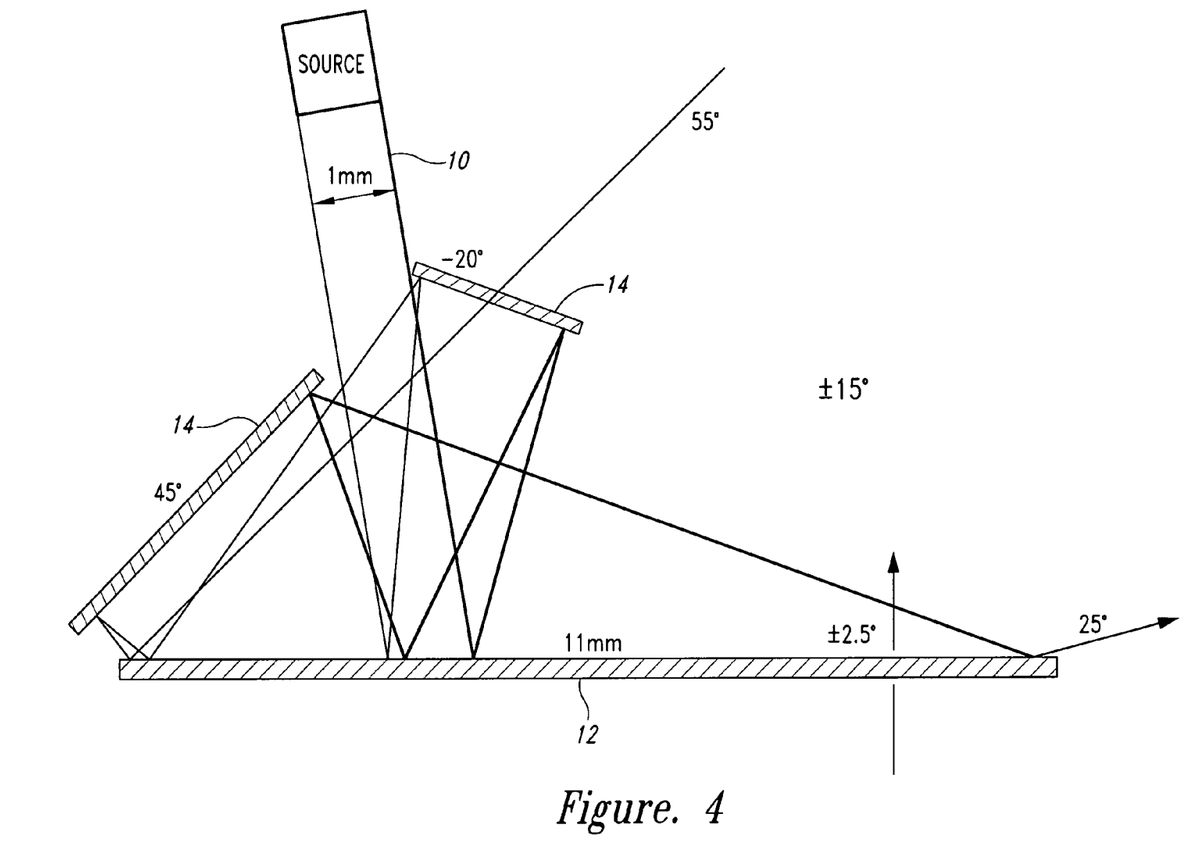
FIG. 4 is a diagram representing another embodiment, projecting electromagnetic radiation with a defined width between a pair of fixed reflectors.

FIG. 4 demonstrates another embodiment, demonstrating that the fixed mirrors may be aligned on either side of the electromagnetic radiation source.

Figure 5:
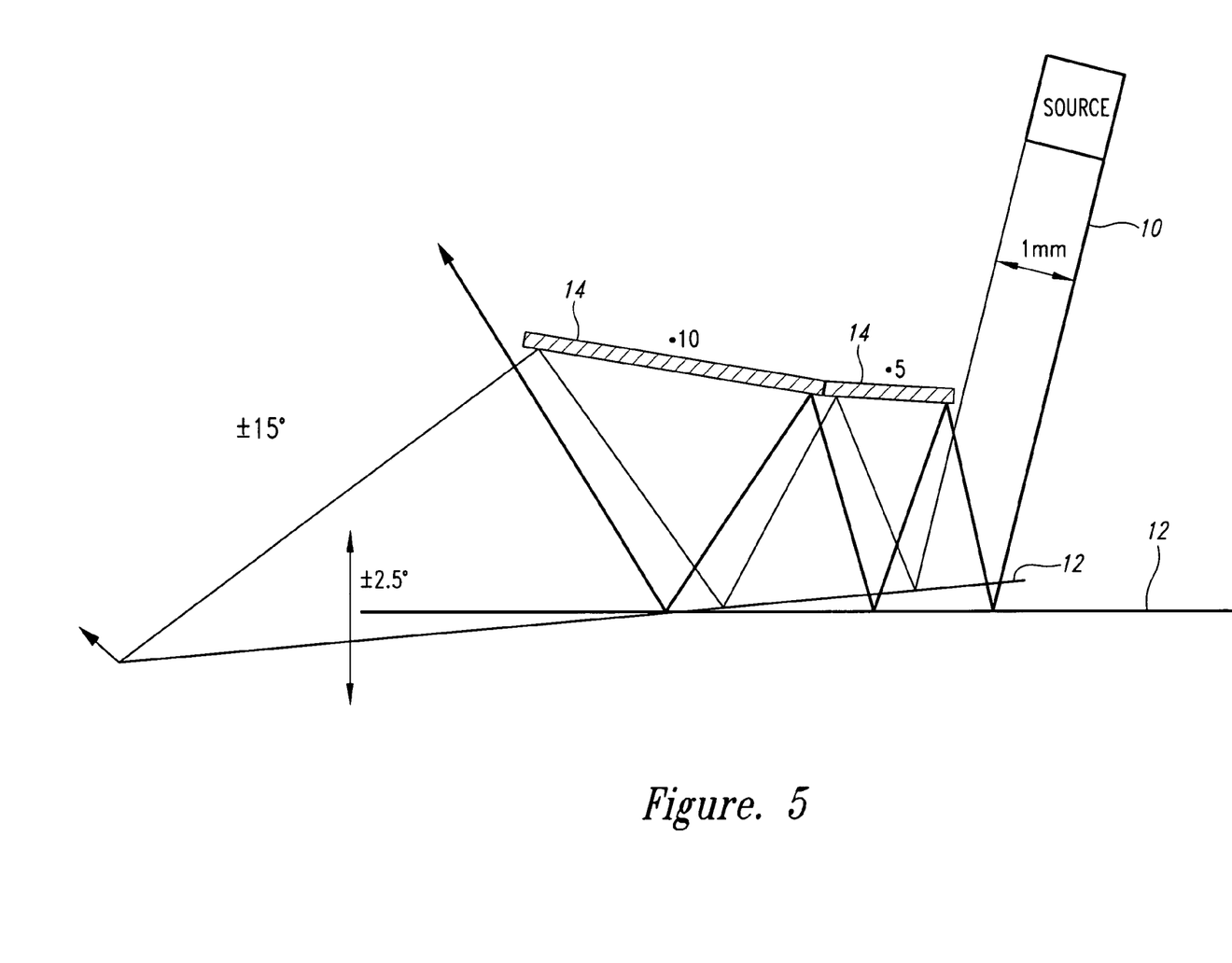
FIG. 5 is a diagram representing an alternative embodiment of the invention using two fixed mirrors.

FIG. 5 demonstrates another embodiment of the present invention with two fixed reflectors 14. The fixed reflectors 14 may be contact with each other, and angled with respect to one another. The fixed reflectors 14 may be planar surfaces.

Figure 6:
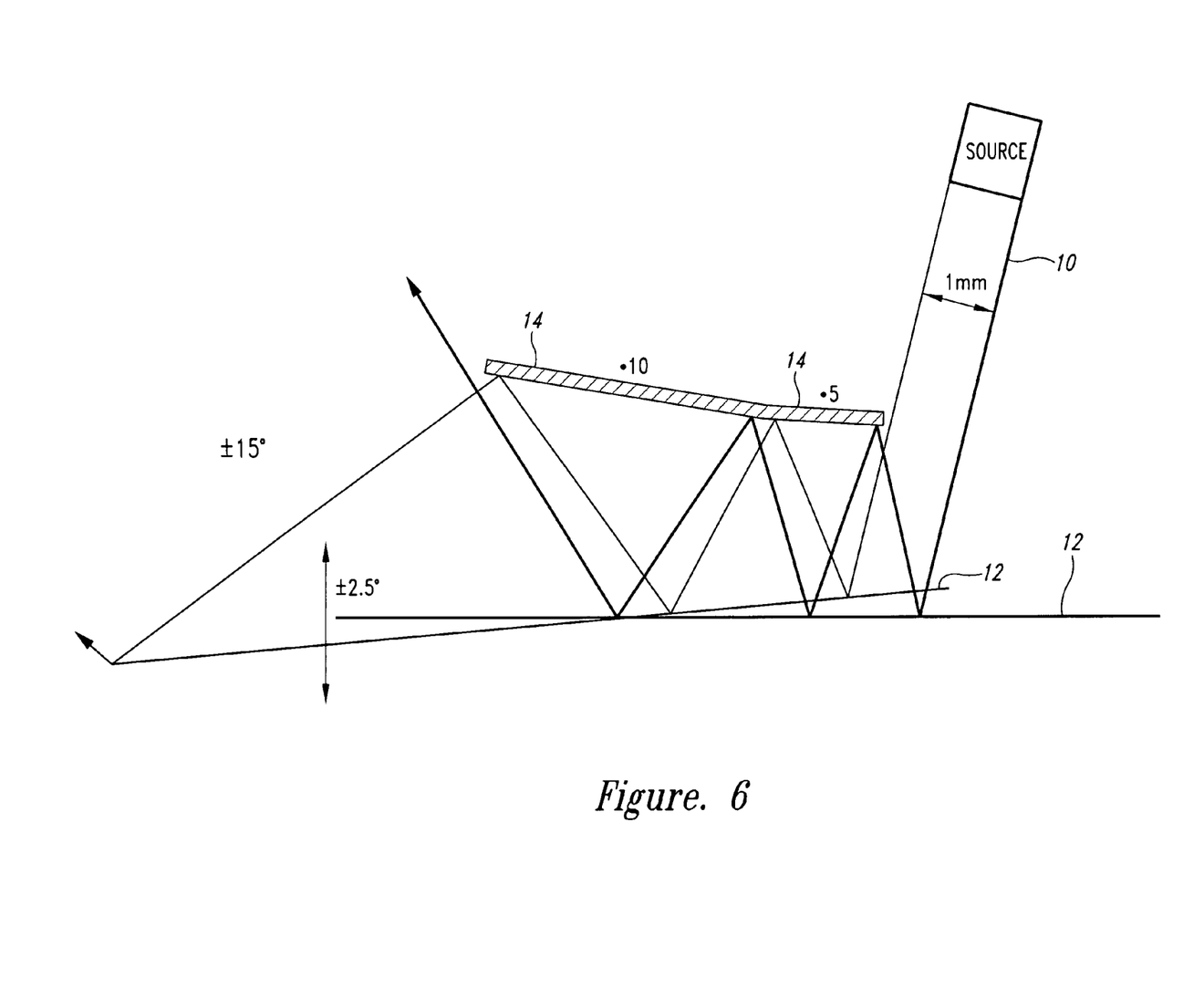
FIG. 6 is a diagram representing an alternative embodiment of the invention.
Figure 7:
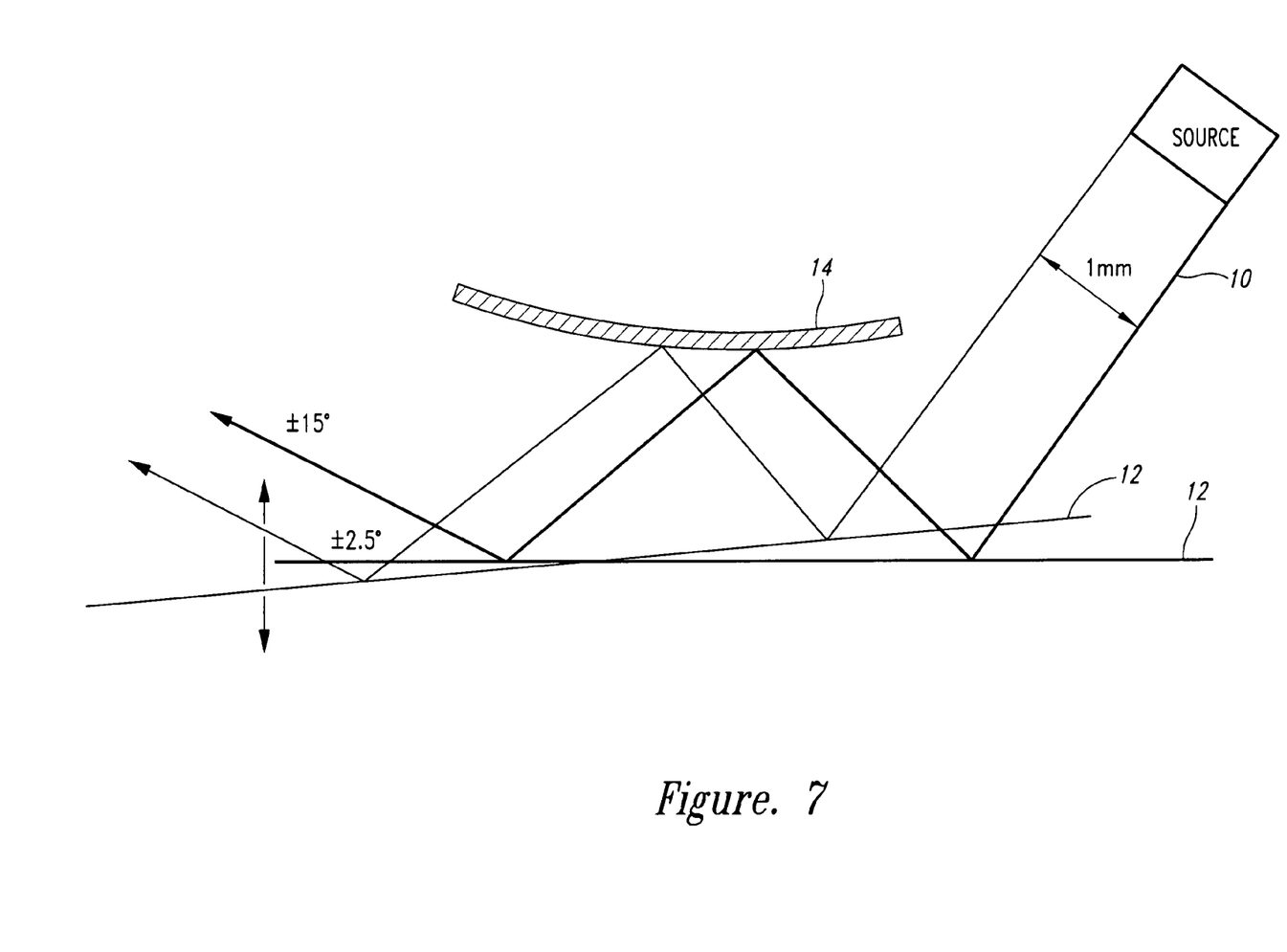
FIG. 7 is a diagram representing an alternative embodiment of the invention.

FIGS. 6 and 7 demonstrate alternative embodiments with a single non-planar fixed reflector 14. As shown in FIG. 6, the fixed reflector 14 may have a first planar surface and second planar surface angled with respect to one another. As shown in FIG. 7, the fixed reflector 14 may be curved.

The specific orientation of the fixed reflector(s) 14 about the movable reflector 12 may be influenced by the type of oscillation/vibration/rotation mechanism used and desired constraints on the size and orientation of the sweeping module with respect to the radiation source. In the present invention, a fixed reflector 14 is one that is not driven to oscillate, vibrate or otherwise rapidly change its angular orientation with respect to the first reflector. The fixed reflector(s) 14 may be configured to be adjustable with respect to their distance from the movable reflector 12. For examples, the fixed reflectors 14 may be adjusted closer to or farther from the movable reflector 12 along a track. The sweep angle can thereby be adjusted without changing the frequency of the movable reflector 12-allowing the movable reflector 12 to remain at the resonance frequency. In a further embodiment, one or more of the fixed reflector(s) 14 may be replaced with at least one movable reflector. The additional or second movable reflector, preferably oscillating or vibrating at a lower amplitude than the first movable reflector, creates a changing sweep angle. The sweep created by this embodiment, alternately moving between wide and narrow, has the ability to, for example, scan machine-readable symbologies at widely varying ranges from the sweep module without requiring operator adjustment of the device between scans.

The form of moveable reflector oscillation/vibration/movement used does not alter the basic idea of the invention. Examples of alternative types of oscillation/vibration include: vibration around an axis of torsion, vibration in inflection, inductive vibration and vibration on an axis of the galvanometric type, in resonance or not.

Energy savings resulting from the reduction of the mechanical expenditure of energy according to the invention are a function of the reduced total mechanical action required. Where the reflectors are 100% reflective and planar, no loss is added by the passage between them and the beam diameter remains unchanged. The movable reflector having to move in a reduced way to obtain a satisfactory sweeping of the beam, there is a reduction in proportion of energy required for obtaining this movement. The mobile element no longer having a great amplitude, mechanical resonance can be abandoned with an actuator, thus authorizing, with reduced energy, an angular sweep at a controlled frequency and amplitude, including static pointing in a given direction (useful for targeting prior to initiating a scanning sweep).

A mechanical structure integrating, for example a laser, its collimator, a movable reflector and an optimized and compact optical provision of fixed reflectors makes it possible to obtain a compact module fulfilling the function of a sweeping laser spot in a reduced package size thereby creating ergonomic, energy consumption, manufacturing and materials cost efficiencies.

The present invention is entitled to a range of equivalents and is to be limited in application or scope only by the following claims.

I claim:

1. An apparatus for generating an angular sweep of a directed propagation of electromagnetic radiation, comprising:
    a first reflector adapted to rotationally oscillate over a first angular range of movement and then over a second angular range of movement directionally opposite the first angular range of movement; and
    a first and a second fixed reflector to reflect the directed propagation of electromagnetic radiation incident upon and reflected by the first reflector onto the fixed reflectors and back to the first reflector;
    the first fixed reflector is contiguous with the second fixed reflector and the first fixed reflector is angled with respect to the second fixed reflector;
    wherein the first angular range of movement of the first reflector creates an increasing sweep of the directed propagation of electromagnetic radiation with each reflection from the first reflector.

2. The apparatus of claim 1, wherein the directed propagation of electromagnetic radiation is selected from a group comprising a laser beam, microwave energy, visible light, non-visible light, infra-red radiation, radar waves, radio waves and combinations thereof.

3. The apparatus of claim 1 wherein the first reflector and the at least two fixed reflectors are mirrors.

4. The apparatus of claim 3, wherein the mirrors are planar.

5. The apparatus of claim 1, wherein a means for oscillation drives the movement of the first reflector.

6. The apparatus of claim 1, wherein the movement of the first reflector is adapted to have a variable amplitude.

7. The apparatus of claim 1, wherein the movement of the first reflector is adapted to have a variable frequency.

8. The apparatus of claim 1, wherein the movement of the first reflector is adapted to have a variable frequency and a variable amplitude.

9. The apparatus of claim 1 wherein a distance between the first reflector and at least one of the fixed reflectors is adjustable.

10. The apparatus of claim 9 wherein at least one reflector is slidable along a track.

11. An apparatus for generating an angular sweep of a directed propagation of electromagnetic radiation, comprising:
a first reflector adapted to move over a first angular range of movement, wherein the first reflector is a planar mirror; and
a first and a second fixed reflector to reflect the directed propagation of electromagnetic radiation incident upon and reflected by the first reflector onto the fixed reflectors and back to the first reflector, wherein the first fixed mirror and the second fixed mirror are each a respective planar mirror;
the first fixed reflector is contiguous with the second fixed reflector and the first fixed reflector is angled with respect to the second fixed reflector;
wherein the first angular range of movement of the first reflector creates an increasing sweep of the directed propagation of electromagnetic radiation with each reflection from the first reflector.

12. The apparatus of claim 11 wherein the first mirror rotationally oscillates over the first angular range of movement and over a second angular range of movement, the second angular range of movement being directionally opposite the first angular range of movement.

13. The apparatus of claim 12, further comprising:
a means for reciprocating the movement of the first mirror over the first and the second ranges of movement.

14. The apparatus of claim 11 wherein the movement of the first reflector is adapted to have a variable amplitude.

15. The apparatus of claim 11 wherein the movement of the first reflector is adapted to have a variable frequency.

16. The apparatus of claim 11 wherein a distance between the first reflector and at least one of the fixed reflectors is adjustable.

17. An apparatus for generating an angular sweep of a directed propagation of electromagnetic radiation, comprising:
a first reflector adapted to move over a first angular range of movement; and
a first and a second fixed reflector to reflect the directed propagation of electromagnetic radiation incident upon and reflected by the first reflector onto the fixed reflectors and back to the first reflector;
the first fixed reflector is contiguous with the second fixed reflector and the first fixed reflector is angled with respect to the second fixed reflector;
wherein the first angular range of movement of the first reflector creates an increasing sweep of the directed propagation of electromagnetic radiation with each reflection from the first reflector; and
wherein a distance between the first reflector and at least one of the fixed reflectors is adjustable.

18. The apparatus of claim 17 wherein the first reflector and the at least two fixed reflectors are mirrors.

19. The apparatus of claim 18 wherein the mirrors are planar.

20. The apparatus of claim 17 wherein the first reflector rotationally oscillates over the first angular range of movement and over a second angular range of movement, the second angular range of movement being directionally opposite the first angular range of movement.

21. The apparatus of claim 20, further comprising: a means for reciprocating the movement of the first reflector over the first and the second ranges of movement.

* * * * *